United States Patent [19]

Seiler

[11] Patent Number: 4,578,457
[45] Date of Patent: Mar. 25, 1986

[54] REACTIVE MONO-AZO DYES AND THE PREPARATION AND USE THEREOF

[75] Inventor: Herbert Seiler, Riehen, Switzerland
[73] Assignee: Ciba-Geigy AG, Basel, Switzerland
[21] Appl. No.: 645,878
[22] Filed: Aug. 29, 1984

Related U.S. Application Data

[63] Continuation of Ser. No. 407,962, Aug. 13, 1982, abandoned.

[30] Foreign Application Priority Data

Aug. 26, 1981 [CH] Switzerland .................. 5512/81

[51] Int. Cl.$^4$ .............................................. C09B 62/08
[52] U.S. Cl. ........................................ 534/632; 8/549; 8/918; 534/751
[58] Field of Search ............... 260/153, 194; 8/549; 534/632, 751

[56] References Cited

U.S. PATENT DOCUMENTS

| | | | |
|---|---|---|---|
| 2,951,070 | 8/1960 | Stephen et al. | 260/153 |
| 3,261,826 | 7/1966 | Andrew | 260/153 |
| 4,091,021 | 5/1978 | Andrew et al. | 260/191 |
| 4,474,697 | 10/1984 | Wunderuch et al. | 260/153 |

FOREIGN PATENT DOCUMENTS 2033279 1/1972 Fed. Rep. of Germany.
2903594 8/1980 Fed. Rep. of Germany.
899376 6/1962 United Kingdom.

Primary Examiner—A. Lionel Clingman
Attorney, Agent, or Firm—Joseph G. Kolodny

[57] ABSTRACT

The invention relates to novel reactive dyes of the formula

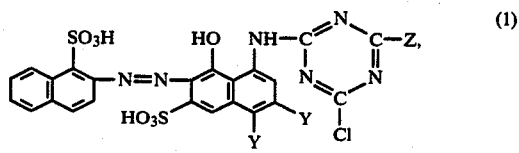

wherein Z is —$NH_2$, $C_1$–$C_6$alkylamino, N,N—di($C_1$–$C_6$)alkylamino, cyclohexylamino, N—($C_1$–$C_6$)alkyl-N-cyclohexylamino, N,N-dicyclohexylamino, phenyl(-$C_1$–$C_2$)alkylamino, N—($C_2$–$C_4$)alkyl-N-phenylamino, naphthylamino, a heterocyclic radical which is bound through an amino group and which may contain further fused carbocyclic rings, or a radical which is bound through the nitrogen atom of an N-heterocyclic ring and which may contain further hetero-atoms, and wherein the alkyl and cyclohexyl moieties, phenyl and naphthyl rings and heterocyclic radicals may be further substituted, and one Y is hydrogen and the other is sulfo. Strong red dyeings and prints are obtained with these dyes on cellulose fibres.

5 Claims, No Drawings

REACTIVE MONO-AZO DYES AND THE PREPARATION AND USE THEREOF

This is a continuation of application Ser. No. 407,962 filed Aug. 13, 1982, now abandoned.

Reactive dyes are used extensively for dyeing and printing textile materials. Although there are available at the present time a large number of useful reactive dyes with different properties and for different utilities, the dyes of the prior art are often not entirely satisfactory in view of the exacting demands made of them with respect to suitability for specific dyeing methods and to the fastness properties of the dyeings obtained. This consideration applies also to reactive dyes used for printing. Especially taking into account shade, the present range of high quality printing dyes is still in general incomplete. There is consequently an urgent need to provide further improved reactive dyes.

The present invention has for its object to provide novel reactive dyes which are particularly suitable for printing. The dyes will have a high degree of fixation and at the same time good washing-off properties with respect to unfixed dye, and they will also have good general fastness properties and, in particular, give shades in the range from red to bluish red. It has been found that the novel dyes defined hereinbelow substantially meet these requirements.

Accordingly, the present invention provides reactive dyes of the formula

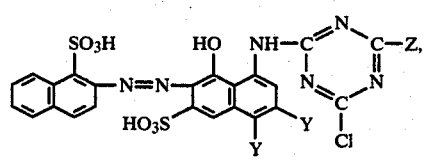 (1)

wherein Z is $-NH_2$, $C_1-C_6$alkylamino, N,N-di($C_1-C_6$)alkylamino, cyclohexylamino, N-($C_1-C_6$)alkyl-N-cyclohexylamino, N,N-dicyclohexylamino, phenyl(-$C_1-C_2$)alkylamino, N-($C_2-C_4$)alkyl-N-phenylamino, naphthylamino, a heterocyclic radical which is bound through an amino group and which may contain further fused carbocyclic rings, or a radical which is bound through the nitrogen atom of an N-heterocyclic ring and which may contain further hetero-atoms, and wherein the alkyl and cyclohexyl moieties, phenyl and naphthyl rings and heterocyclic radicals may be further substituted, and one Y is hydrogen and the other is sulfo.

The alkyl radicals may be straight chain or branched and preferably contain 1 to 4 carbon atoms. Suitable phenyl($C_1-C_2$)alkyl radicals are in particular benzyl and phenethyl. Examples of N-($C_2-C_4$)alkyl-N-phenylamino radicals are N-ethylanilino, N-propylanilino and N-butylanilino. Heterocyclic radicals are preferably furan, thiophene, pyrazole, pyridine, pyrimidine, quinoline, benzimidazole, benzthiazole and benzoxazole radicals. Suitable amino groups in which the amino-nitrogen atom is a member of an N-heterocyclic ring are preferably radicals of 6-membered N-heterocyclic compounds which may contain nitrogen, oxygen and sulfur atoms as further hetero-atoms.

The alkyl, cyclohexyl, phenyl and naphthyl radicals, the heterocyclic radicals and the N-heterocyclic rings may be further substituted, e.g. by halogen such as fluorine, chlorine and bromine; nitro, cyano, trifluoromethyl, sulfamoyl, carbamoyl, $C_1-C_4$alkyl, $C_1-C_4$alkoxy, acylamino such as acetylamino; ureido, hydroxy, carboxy, sulfomethyl and sulfo.

Typical examples of the amino group Z in formula (1) are: $-NH_2$, methylamino, ethylamino, propylamino, isopropylamino, butylamino, hexylamino, β-methoxyethylamino, γ-methoxypropylamino, β-ethoxyethylamino, N,N-dimethylamino, N,N-diethylamino, β-chloroethylamino, β-cyanoethylamino, γ-cyanopropylamino, β-carboxyethylamino, sulfomethylamino, β-sulfoethylamino, β-hydroxyethylamino, N,N-di-β-hydroxyethylamino, γ-hydroxypropylamino, benzylamino, phenethylamino, cyclohexylamino, N-ethyl-N-phenylamino, N-propyl-n-phenylamino, N-butyl-N-phenylamino, N-β-cyanoethyl-N-phenylamino, N-ethyl-2-methylphenylamino, N-ethyl-4-methylphenylamino, N-ethyl-3-sulfophenylamino, N-ethyl-4-sulfophenylamino, 4-sulfonaphthyl-(1)-amino, 3,6-disulfonaphthyl-(1)-amino, 3,6,8-trisulfonaphthyl-(1)-amino, 4,6,8-trisulfonaphthyl-(1)-amino, 6-sulfonaphthyl-(2)-amino, pyridyl-(2)-amino, morpholino, piperidino and piperazino.

Preferred reactive dyes are those of the formula (1), wherein the α-oriented Y is hydrogen and the β-oriented Y is sulfo.

Also preferred are reactive dyes of the formula (1), wherein Z is $-NH_2$, $C_1-C_4$alkylamino or N,N-di($C_1-C_4$)alkylamino, wherein the alkyl moiety or moieties may be substituted by hydroxy or sulfo; N-($C_2-C_4$)alkyl-N-phenylamino, wherein the alkyl moiety may be substituted by cyano and the phenyl ring by methyl, ethyl, butyl, chlorine, bromine or sulfo; or naphthylamino which may be substituted by sulfo.

Further preferred reactive dyes of formula (1) are those wherein Z is a radical of the formula

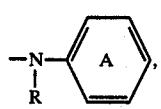 (2)

wherein R is an unsubstituted or substituted $C_2-C_4$alkyl radical and the phenyl ring A may contain further substituents.

A suitable alkyl radical R in formula (2) is a straight chain or branched alkyl radical which may also be substituted, e.g. by halogen, hydroxy, cyano or sulfo. Typical examples of R are: ethyl, propyl, isopropyl, butyl, isobutyl, sec-butyl, tert-butyl, β-chloroethyl, β-hydroxyethyl, β-hydroxybutyl, β-cyanoethyl, β-sulfoethyl, and β-sulfatoethyl. Examples of further substituents in the phenyl ring A are chlorine, methyl, methoxy, carboxy and sulfo.

Further preferred reactive dyes of formula (1) are also those wherein Z is a radical of the formula (2), wherein R is $C_2-C_4$alkyl and the phenyl ring A may be further substituted by methyl, chlorine or sulfo.

Particularly preferred reactive dyes of the above defined kind are those wherein R in formula (2) is ethyl and those wherein the phenyl ring A does not contain further substituents.

A valuable representative of this preferred class is the reactive dye of the formula

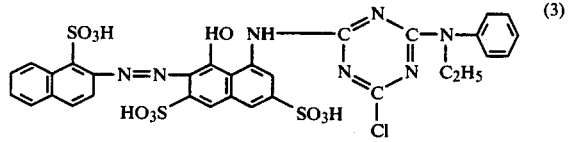

(3)

The process for preparing the reactive dyes of the formula (1) comprises reacting together, in any order, a diazotised diazo component of the formula

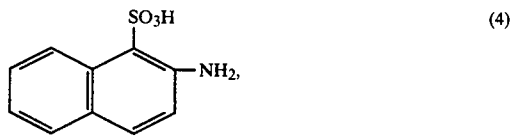

(4)

1-amino-8-hydroxynaphthalene-3,6- or -4,6-disulfonic acid, 2,4,6-trichloro-s-triazine and an amine of the formula

H—Z     (5)

by coupling and condensation.

Preferred reactive dyes of the formula (1) are prepared by reacting with one another, in any order, diazotised 2-aminonaphthalene-1-sulfonic acid, 1-amino-8-hydroxynaphthalene-3,6-disulfonic acid, 2,4,6-trichloro-s-triazine and an amine of the formula (5).

A preferred embodiment is that wherein the amine of the formula (5) is ammonia, a $C_1$–$C_4$alkylamine or N,N-di($C_1$–$C_4$)alkylamine, in which the alkyl moiety or moieties respectively may be substituted by hydroxy or sulfo, an N-($C_2$–$C_4$)alkyl-N-phenylamine, the alkyl moiety of which may be substituted by cyano and the phenyl ring by methyl, ethyl, butyl, chlorine, bromine or sulfo, or a naphthylamine which may be substituted by sulfo.

It is preferred to use an amine of the formula

(6)

wherein R is $C_2$–$C_4$alkyl and the phenyl ring A may be further substituted by methyl, chlorine or sulfo.

As the individual process steps indicated above, viz. diazotisation, coupling and condensation, may be carried out in varying sequence, and in some cases may also be carried out simultaneously, different variants of the process are possible. The starting materials to be employed for each partial reaction may be deduced from formula (1). In general, the reaction is conducted stepwise in succession and the sequence of the simple reactions between the individual reaction components may be freely chosen.

The most important process variants comprise:

(1) Coupling a diazotised diazo component of the formula (4) with 1-amino-8-hydroxynaphthalene-3,6- or -4,6-disulfonic acid, condensing the monoazo compound thereby obtained with 2,4,6-trichloro-s-triazine, and condensing the primary condensation product with an amine of the formula (5).

The last two reaction steps may also be carried out in reverse order by first condensing the 2,4,6-trichloro-s-triazine with an amine of the formula (5), and condensing the resultant primary condensation product with the above monoazo compound.

(2) Condensing 1-amino-8-hydroxynaphthalene-3,6- or -4,6-disulfonic acid with 2,4,6-trichloro-s-triazine, condensing the primary condensation product with an amine of the formula (5), and coupling the secondary condensation product with a diazotised diazo component of the formula (4). In this variant too, the condensation with the amine of the formula (5) may be carried out as final reaction step as in (1) above.

The preferred method of preparing the reactive dye of the formula (3) comprises condensing 1-amino-8-hydroxynaphthalene-3,6-disulfonic acid with 2,4,6-trichloro-s-triazine, condensing the primary condensation product with N-ethylaniline, and coupling the secondary condensation product of the formula

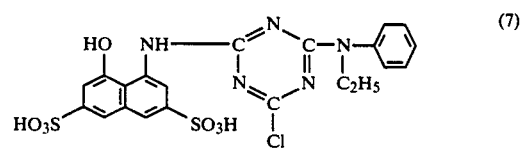

(7)

with diazotised 2-aminonaphthalene-1-sulfonic acid.

Representative examples of starting compounds for the preparation of the reactive dyes of formula (1) are:

(a) Diazo component of the formula (4): 2-aminonaphthalene-1-sulfonic acid (Tobias acid).

(b) 1-Amino-8-hydroxynaphthalene-3,6-disulfonic acid (H-acid). 1-Amino-8-hydroxynaphthalene-4,6-disulfonic acid (K-acid).

(c) 2,4,6-Trichloro-s-triazine (cyanuric chloride).

(d) Amines of the formula (5):
ammonia, methylamine, dimethylamine, ethylamine, diethylamine, propylamine, isopropylamine, butylamine, dibutylamine, isobutylamine, sec-butylamine, tert-butylamine, hexylamine, methoxyethylamine, ethoxyethylamine, methoxypropylamine, chloroethylamine, hydroxyethylamine, dihydroxyethylamine, hydroxypropylamine, aminoethanesulfonic acid, β-sulfatoethylamine, benzylamine, phenethylamine, cyclohexylamine, N-ethylaminobenzene, N-propylaminobenzene, N-butylaminobenzene, N-hexylaminobenzene, N-β-hydroxyethylaminobenzene, N-β-chloroethylaminobenzene, N-β-cyanoethylaminobenzene, N-β-sulfoethylaminobenzene, 1-(N-ethylamino)-2-, -3- or -4-methylbenzene, 1-(N-ethylamino)-2-, -3- or -4-ethylbenzene, 1-(N-ethylamino)-2-, -3- or -4-chlorobenzene, 1-N-ethylaminobenzene-3- or -4-sulfonic acid, 1-(N-ethylamino)-4-butylbenzene, 1-(N-ethylamino)-4-hexylbenzene, 1-(N-ethylamino)-4-octylbenzene, 1-(N-ethylamino)-4-vinylbenzene, 1-N-n-butylamino-3-methylbenzene, N-isopropylaminobenzene, N-isobutylaminobenzene, N-sec-butylaminobenzene, 1-(N-ethylamio)-4-fluorobenzene, 1-naphthylamine, 2-naphthylamine, 1-naphthylamine-2-, -3-, -4-, -5-, -6-, -7- and -8-sulfonic acid, 2-naphthylamine-1-, -3-, -4-, -5-, -6-, -7- and -8-sulfonic acid, 1-naphthylamine-2,4- -2,5- -2,7-, -2,8-, -3,5-, -3,6- -3,7- 3,8- -4,6-, 4,7-, 4,8- and 5,8-disulfonic acid, 2-naphthylamine-1,5-, 1,6-, 1,7-, -3,6-, -3,7-, -4,7-, -4,8-, -5,7- and -6,8-disulfonic acid, 1-naphthylamine-2,4,6- -2,4,7- -2,5,7- -3,5,7- -3,6,8- and -4,6,8-trisulfonic acid, 2-naphthylamine-1,3,7-, -1,5,7-, -3,5,7-, -3,6,7-, -3,6,8- and -4,6,8-trisulfonic acid, 2-, 3- and 4-aminopyridine, 2-aminobenzthiazole, 5-, 6- and 8- aminoquinoline, 2-aminopyrimidine, morpholine, piperidine and piperazine.

The diazotisation of the diazo component is usually effected by treatment with nitrous acid in an aqueous solution of mineral acid at low temperature; and the coupling to the coupling components is carried out at weakly acid, neutral or weakly alkaline pH values.

The condensation reactions of the 2,4,6-trichloro-s-triazine with the coupling components and the amino compounds of the formula (5) are preferably carried out in aqueous solution or suspension, at low temperature, and at a weakly acid, neutral or weakly alkaline pH value, such that at least one removable chlorine atom remains in the final reactive dye of the formula (1). It is advantageous to neutralise the hydrogen chloride set free during the condensation by the continuous addition of an aqueous alkali hydroxide, carbonate or bicarbonate.

The reactive dyes of the formula (1) can be isolated and processed to useful dry dyeing preparations. Isolation is effected preferably at as low temperature as possible by salting out and filtration. The filtered dyes can be dried, if desired after addition of extenders and/or buffers, for example after addition of a mixture of equal parts of monosodium and disodium phosphate. Preferably, drying is carried out at not too elevated temperature and under reduced pressure. By spray drying the entire reaction mixture, it is possible in certain cases to obtain the dry preparations of the invention direct, i.e. without first isolating the dyes.

The dyes of the formula (1) are fibre-reactive, as they contain a removable chlorine atom in the s-triazine radical. By fibre-reactive compounds are meant those compounds which are able to react with the hydroxyl groups of cellulose or with the amino groups of natural or synthetic polyamides to form covalent chemical bonds.

The reactive dyes of the formula (1) are novel. They are of high reactivity and they produce dyeings of good wetfastness and good lightfastness. It must be singled out for special mention that the dyes have good solubility and excellent fixation, and that non-fixed dye can be readily removed.

The reactive dyes of the formula (1) are suitable for dyeing and printing a very wide variety of materials such as silk, leather, wool, polyamide and polyurethane fibres, and especially cellulosic materials of fibrous structure, such as linen, cellulose, regenerated celulose and, in particular, cotton. They are suitable both for exhaust dyeing and for dyeing by the pad-dyeing process, in which the goods are impregnated with aqueous and, if appropriate, also with salt-containing dye solutions, and the dyes are fixed after treatment with alkali or in the presence of alkali, with or without the application of heat.

They are also suitable for printing, especially on cotton, and also for printing nitrogen-containing fibres, e.g. wool, silk, or blends containing wool.

It is advisable to rinse the dyeings and prints thoroughly with cold and hot water, if desired with the addition of an agent which acts as a dispersant and promotes the diffusion of non-fixed dye.

The preparation of the monoazo intermediates is not always described in the following preparatory Examples, but may be readily inferred from what has been stated above. Parts and percentages are by weight.

EXAMPLE 1

31.9 g of 1-amino-8-hydroxynaphthalene-3,6-disulfonic acid are dissolved in 100 ml of water by adding 50 ml of 2N sodium hydroxide solution. This solution is then slowly added dropwise to an ice-cold suspension of 18.5 g of 2,4,6-trichloro-1,3,5-triazine in 200 ml of water. Then 50 ml of 2N sodium hydroxide solution are added over 2 to 3 hours such that the pH of the reaction mixture always remains 1. To the primary condensation product so obtained is then added an aqueous solution of 12.1 g of N-ethylaminobenzene in hydrochloric acid. The pH is kept at 3 with 2N sodium hydroxide solution, while the temperature slowly rises to 20°–25° C. To bring the condensation to completion, the temperature is finally raised to 30°–35° C. and the pH to 4–4.5.

22.3 g of 2-naphthylamine-1-sulfonic acid are diazotised in conventional manner in the presence of hydrochloric acid and 6.9 g of sodium nitrite. The diazo compound is then added at 0°–5° C. to the above prepared suspension of the reactive coupling component and the pH of the coupling mixture is kept at 9 with a 20% solution of sodium carbonate. The reaction mixture is stirred for 1 hour and the temperature is then allowed to rise to 20° C. The partially precipitated dye is completely salted out with sodium chloride and isolated by filtration. The filter cake is washed and vacuum dried at 40° C., affording the dye which in the form of the free acid has the formula

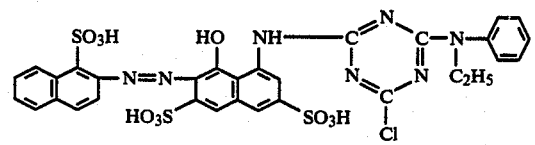

It dyes cotton in strong bluish red shades.

A further peparatory method consists in adding the acid primary condensation product obtained from 1-amino-8-hydroxynaphthalene-3,6-disulfonic acid and 2,4,6-trichloro-1,3,5-triazine at 5°–15° C. and pH 7 to an aqueous emulsion of N-ethylaminobenzene which contains an emulsifier. The condensation is complete after 1½ hours and the dye is prepared as described above in this Example in the same purity and yield.

Similar dyes are obtained by the procedure of this Example by using the corresponding diazo, coupling and amine components listed in the following table.

TABLE

| No | Diazo component | Coupling component | Amine component | Shade |
|---|---|---|---|---|
| 2 | 2-naphthylamine-1-sulfonic acid | 1-amino-8-hydroxynaphtha-lene-3,6-disulfonic acid | 3-ethylamino-1-methylbenzene | bluish red |
| 3 | 2-naphthylamine-1-sulfonic acid | 1-amino-8-hydroxynaphtha-lene-3,6-disulfonic acid | 4-ethylamino-1-methylbenzene | " |
| 4 | 2-naphthylamine-1-sulfonic acid | 1-amino-8-hydroxynaphtha-lene-3,6-disulfonic acid | 4-ethylaminobenzene-1-sulfonic acid | " |
| 5 | 2-naphthylamine-1-sulfonic acid | 1-amino-8-hydroxynaphtha-lene-3,6-disulfonic acid | N—n-propylaminobenzene | " |

TABLE-continued

| No | Diazo component | Coupling component | Amine component | Shade |
|----|----|----|----|----|
| 6 | 2-naphthylamine-1-sulfonic acid | 1-amino-8-hydroxynaphthalene-3,6-disulfonic acid | 2-naphthylamine-4,8-disulfonic acid | " |
| 7 | 2-naphthylamine-1-sulfonic acid | 1-amino-8-hydroxynaphthalene-3,6-disulfonic acid | 2-naphthylamine-3,6-disulfonic acid | " |
| 8 | 2-naphthylamine-1-sulfonic acid | 1-amino-8-hydroxynaphthalene-3,6-disulfonic acid | 2-naphthylamine-6,8-disulfonic acid | " |
| 9 | 2-naphthylamine-1-sulfonic acid | 1-amino-8-hydroxynaphthalene-3,6-disulfonic acid | 2-naphthylamine-3,6,8-trisulfonic acid | " |
| 10 | 2-naphthylamine-1-sulfonic acid | 1-amino-8-hydroxynaphthalene-3,6-disulfonic acid | 2-naphthylamine-4,6,8-trisulfonic acid | " |
| 11 | 2-naphthylamine-1-sulfonic acid | 1-amino-8-hydroxynaphthalene-3,6-disulfonic acid | 2-aminoethanol | " |
| 12 | 2-naphthylamine-1-sulfonic acid | 1-amino-8-hydroxynaphthalene-3,6-disulfonic acid | 3-amino-1-propanol | " |
| 13 | 2-naphthylamine-1-sulfonic acid | 1-amino-8-hydroxynaphthalene-3,6-disulfonic acid | taurin | " |
| 14 | 2-naphthylamine-1-sulfonic acid | 1-amino-8-hydroxynaphthalene-3,6-disulfonic acid | methylamine | " |
| 15 | 2-naphthylamine-1-sulfonic acid | 1-amino-8-hydroxynaphthalene-3,6-disulfonic acid | bis-(2-hydroxyethyl)-amine | " |
| 16 | 2-naphthylamine-1-sulfonic acid | 1-amino-8-hydroxynaphthalene-3,6-disulfonic acid | glycine | " |
| 17 | 2-naphthylamine-1-sulfonic acid | 1-amino-8-hydroxynaphthalene-3,6-disulfonic acid | 2-ethylamino-1-methylbenzene | " |
| 18 | 2-naphthylamine-1-sulfonic acid | 1-amino-8-hydroxynaphthalene-3,6-disulfonic acid | N—n-butylaminobenzene | " |
| 19 | 2-naphthylamine-1-sulfonic acid | 1-amino-8-hydroxynaphthalene-3,6-disulfonic acid | 2-naphthylamine-1-sulfonic acid | " |
| 20 | 2-naphthylamine-1-sulfonic acid | 1-amino-8-hydroxynaphthalene-3,6-disulfonic acid | 2-naphthylamine-6-sulfonic acid | " |
| 21 | 2-naphthylamine-1-sulfonic acid | 1-amino-8-hydroxy-naphthalene-4,6-disulfonic acid | 2-aminoethanol | " |
| 22 | 2-naphthylamine-1-sulfonic acid | 1-amino-8-hydroxy-naphthalene-4,6-disulfonic acid | taurin | " |
| 23 | 2-naphthylamine-1-sulfonic acid | 1-amino-8-hydroxynaphthalene-4,6-disulfonic acid | N—ethylaminobenzene | " |
| 24 | 2-naphthylamine-1-sulfonic acid | 1-amino-8-hydroxynaphthalene-4,6-disulfonic acid | 2-ethylamino-1-methylbenzene | " |
| 25 | 2-naphthylamine-1-sulfonic acid | 1-amino-8-hydroxynaphthalene-4,6-disulfonic acid | 4-ethylaminobenzene-1-sulfonic acid | " |
| 26 | 2-naphthylamine-1-sulfonic acid | 1-amino-8-hydroxynaphthalene-4,6-disulfonic acid | 3-n-butylamino-1-methylbenzene | " |
| 27 | 2-naphthylamine-1-sulfonic acid | 1-amino-8-hydroxynaphthalene-4,6-disulfonic acid | 2-naphthylamine-4,8-disulfonic acid | " |
| 28 | 2-naphthylamine-1-sulfonic acid | 1-amino-8-hydroxynaphthalene-4,6-disulfonic acid | 2-naphthylamine-6,8-disulfonic acid | " |
| 29 | 2-naphthylamine-1-sulfonic acid | 1-amino-8-hydroxynaphthalene-4,6-disulfonic acid | 2-naphthylamine-1,5-disulfonic acid | " |
| 30 | 2-naphthylamine-1-sulfonic acid | 1-amino-8-hydroxynaphthalene-4,6-disulfonic acid | 2-naphthylamine-3,6,8-trisulfonic acid | " |
| 31 | 2-naphthylamine-1-sulfonic acid | 1-amino-8-hydroxynaphthalene-4,6-disulfonic acid | 2-naphthylamine-4,6,8-trisulfonic acid | " |
| 32 | 2-naphthylamine-1-sulfonic acid | 1-amino-8-hydroxynaphthalene-4,6-disulfonic acid | ethylamine | red |
| 33 | 2-naphthylamine-1-sulfonic acid | 1-amino-8-hydroxynaphthalene-4,6-disulfonic acid | 3-amino-1-propanol | " |
| 34 | 2-naphthylamine-1-sulfonic acid | 1-amino-8-hydroxynaphthalene-4,6-disulfonic acid | bis-(2-hydroxyethyl)-amine | " |
| 35 | 2-naphthylamine-1-sulfonic acid | 1-amino-8-hydroxynaphthalene-4,6-disulfonic acid | glycine | " |
| 36 | 2-naphthylamine-1-sulfonic acid | 1-amino-8-hydroxynaphthalene-4,6-disulfonic acid | N—n-propylaminobenzene | " |
| 37 | 2-naphthylamine-1-sulfonic acid | 1-amino-8-hydroxynaphthalene-4,6-disulfonic acid | 3-ethylamino-1-methyl-benzene | " |
| 38 | 2-naphthylamine-1-sulfonic acid | 1-amino-8-hydroxynaphthalene-4,6-disulfonic acid | 4-ethylamino-1-methyl-benzene | " |
| 39 | 2-naphthylamine-1-sulfonic acid | 1-amino-8-hydroxynaphthalene-4,6-disulfonic acid | 2-naphthylamine-1-sulfonic acid | " |
| 40 | 2-naphthylamine-1-sulfonic acid | 1-amino-8-hydroxynaphthalene-4,6-disulfonic acid | 2-naphthylamine-5-sulfonic acid | " |
| 41 | 2-naphthylamine-1-sulfonic acid | 1-amino-8-hydroxynaphthalene-4,6-disulfonic acid | 2-naphthylamine-6-sulfonic acid | " |
| 42 | 2-naphthylamine-1-sulfonic acid | 1-amino-8-hydroxynaphthalene-4,6-disulfonic acid | 2-naphthylamine-3,6-disulfonic acid | " |

DYEING PROCEDURE 1

2 parts of the dye obtained in Example 1 are dissolved at 20° C. to 50° C. in 100 parts of water with the addition of 5 to 20 parts of urea and 2 parts of calcined sodium carbonate. A cotton fabric is impregnated with this solution to a pick-up of 60 to 80% and then dried. The fabric is then thermofixed for 1½ to 5 minutes at 140° to 210° C., subsequently soaped for a quarter of an hour in a 0.1% boiling solution of a non-ionic detergent, rinsed and dried.

DYEING PROCEDURE 2

2 parts of the dye obtained in Example 1 are dissolved at 75° C. in 2000 parts of water with the addition of 120 parts of sodium chloride or calcined Glauber's salt. Then 100 parts of cotton fabric are put into this dyebath and the temperature is kept constant for 30 to 60 minutes. Then 10 parts of calcined sodium carbonate and 4 ml of sodium hydroxide solution (36°Bé) are added. The temperature is kept for a further 45 to 60 minutes at 75° to 80° C. and the fabric is then soaped for 15 minutes in a 0.1% boiling solution of a non-ionic detergent, rinsed and dried.

DYEING PROCEDURE 3

2 parts of the dye obtained in Example 1 are disolved in 100 parts of water while adding 0.5 part of sodium m-nitrobenzenesulfonate. A cotton fabric is impregnated with this solution to a liquor pick-up of 75% and then dried.

The fabric is then impregnated with a warm solution of 20° C. which contains 5 g/l of sodium hydroxide and 300 g/l of sodium chloride, and then expressed to a pick-up of 75%. The dyeing is steamed for 30 seconds at 100° to 101° C., rinsed, soaped for a quarter of an hour in a 0.3% boiling solution of a non-ionic detergent, rinsed and dried.

DYEING PROCEDURE 4

2 parts of the dye obtained in Example 1 are dissolved in 100 parts of water. The solution is added to 1900 parts of cold water, 60 parts of sodium chloride are added and 100 parts of a cotton fabric are put into this dyebath. The temperature is raised to 60° C. and 40 parts of calcined sodium carbonate and another 60 parts of sodium chloride are added after 30 minutes. The temperature is kept for 30 minutes at 60° C. The dyeing is rinsed and then soaped for 15 minutes in a 0.3% boiling solution of a non-ionic detergent, rinsed and dried.

PRINTING PROCEDURE 2 parts of the dye obtained according to Example 1 are sprinkled, with rapid stirring, into 100 parts of a stock thickener which contains 45 parts of 5% sodium alginate thickening, 32 parts of water, 20 parts of urea, 1 part of sodium m-nitrobenzenesulfonate and 2 parts of sodium carbonate.

A cotton fabric is printed with this printing paste on a roller printing machine. The printed fabric is steamed for 4 to 8 minutes at 100° C. in saturated steam, then thoroughly rinsed in cold and hot water, in the process of which chemically nonfixed dye can be very easily removed from the fibre, and then dried.

What is claimed is:

1. A reactive dye of the formula

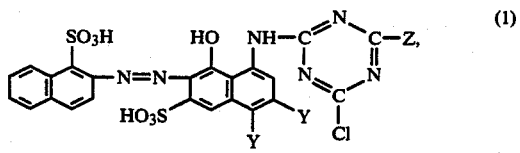

wherein Z is a radical of the formula

wherein R is $C_2$–$C_4$alkyl and the phenyl ring A is further unsubstituted or substituted by methyl, chlorine or sulfo; and one Y is hydrogen and the other Y is sulfo.

2. A reactive dye according to claim 1, wherein the α-oriented Y is hydrogen and the β-oriented Y is sulfo.

3. A reactive dye according to claim 1, wherein R is ethyl.

4. A reactive dye according to claim 1, wherein the phenyl ring A contains no further substituents.

5. The reactive dye according to claim 4 of the formula

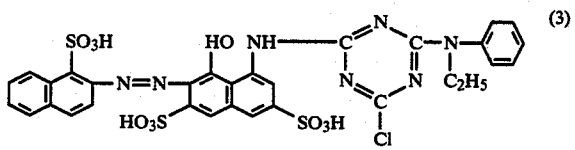

* * * * *